May 19, 1959 J. W. THOMPSON 2,887,369
CRACKED GASOLINE STABILIZED AGAINST DETERIORATION IN THE PRESENCE OF WATER HAVING A pH OF LESS THAN 5
Filed Dec. 7, 1956
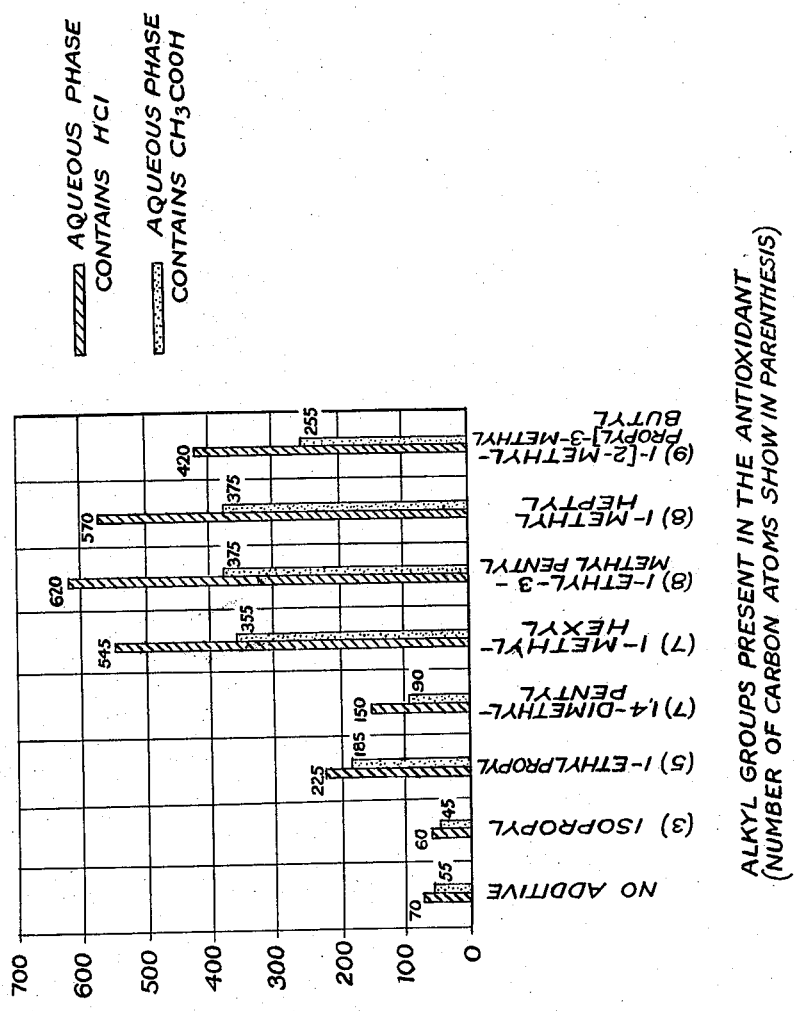
JohnW.Thompson
INVENTOR.
BY Daniel J. Mayne
Charles L. Good
ATTORNEYS

United States Patent Office 2,887,369
Patented May 19, 1959

2,887,369
CRACKED GASOLINE STABILIZED AGAINST DETERIORATION IN THE PRESENCE OF WATER HAVING A pH OF LESS THAN 5

John W. Thompson, Kingsport, Tenn., assignor to Eastman Kodak Company, Rochester, N.Y., a corporation of New Jersey Application December 7, 1956, Serial No. 626,891

6 Claims. (Cl. 44—74)

This invention relates to certain gasoline compositions normally subject to oxidative deterioration when in contact for a period of time with an aqueous phase having a pH of less than about 5. Such compositions are not satisfactorily susceptible to stabilization with N,N'-dialkyl-p-phenylenediamines wherein the alkyl radicals contain the usual lower number of carbon atoms such as when the alkyl radical is a secondary butyl radical. The invention contemplates the employment of such antioxidants where said alkyl radical is one or more of a group consisting of 1-methylhexyl, 1-ethyl-3-methyl-pentyl and 1-methylheptyl. This invention pertains to these novel derivatives of p-phenylenediamine, to the method of employing them for stabilizing gasoline compositions and to the compositions which have been so stabilized.

It is well known that gasoline motor fuels (particularly those manufactured by catalytic processes including gasoline compositions ordinarily referred to as cracked gasoline and "alkylate" gasoline) tend to form during storage undesirable decomposition products which are gummy in nature and result in the formation of resin-like deposits in the fuel system of internal combustion engines in which such a gasoline is employed.

After the cracked gasoline has been manufactured it is distributed in many commercial instances through a series of storage operations in large tanks, shipment in railway tank cars, storage again in large tanks, shipment in gasoline tank trucks, and storage again in fairly good size tanks prior to dispensing the gasoline to the tank of the vehicle or airplane which is going to use the gasoline. The operations of introducing the gasoline into the various tanks, removing the gasoline from the tanks and transporting the movable tanks involve quite a bit of agitation of the gasoline. Some and occasionally all of the tanks in question contain substantial quantities of water which may be present for various reasons including the water formed by the condensation of the moisture from the air present within the tank.

In many instances the water existing as an aqueous phase in contact with the gasoline has a fairly pronounced acidic character. The degree of acidity generally results in a pH of less than 5. The acidic nature of the aqueous phase results from various factors. Large volumes of gasoline components, particularly aviation gasoline such as "alkylate" gasoline, are produced by methods involving an HF or $H_2SO_4$ catalyst. Also, some gasolines are washed with $H_2SO_4$ to remove impurities or undesirable constituents. Trace amounts of acid may carry over into the finished gasoline. Further, acids used during processing may react with gasoline constituents to provide organic sulfonates or other acidic products which may be permitted to remain in the gasoline since they are difficult to remove. Moreover, oxidation of the gasoline while in storage may lead to organic acids, or such acids may otherwise be present in the gasoline. Furthermore, gasoline tank storage waters may absorb enough $CO_2$ from the air to lower the water pH sufficiently to cause a pronounced degree of acidity. In addition, some gasoline additives such as certain corrosion inhibitors may be acidic in nature. Any one of the above or other factors or a combination thereof can lead to the formation of acidic water which is present as an aqueous phase in tanks containing gasoline.

It is known that the deterioration of gasoline can be retarded by the incorporation of an antioxidant. The antioxidants disclosed in the various published patents include a wide variety of compounds which have both good and objectionable features. Some of the suggested compounds are relatively poor gum inhibitors but are fairly effective for stabilizing the tetraethyl lead content in aviation gasolines. Some of the alkylated aminophenols are effective for inhibiting gum formation and for stabilizing tetraethyl lead but cannot be used in aviation gasoline because of their tendency to form deposits and interfere with the efficient operation of the fuel intake system. One of the best generally effective and widely used classes of antioxidants includes the N,N'-dialkyl-p-phenylenediamines. Certain of these antioxidants have been used on a commercial scale as gum inhibitors in cracked gasolines and as lead stabilizers in aviation fuels. However, these compounds, such as N,N'-di-sec. butyl-p-phenylenediamine and others of this class are subject to the disadvantage that they develop a red color in gasoline. This is particularly objectionable when such an antioxidant is used in aviation fuels which are colored with dyes to designate the grade or octane range of the aviation motor fuel. Thus, the presence of such inhibitors in blue gasoline may result in a change of color so as to form a purple gasoline which might be incorrectly identified as the wrong grade or octane range. Although some work has been done in regard to stabilizing the color of gasolines containing this class of antioxidants, nothing of great commercial practicability has yet been developed.

Although color difficulties are an important consideration, an even greater difficulty with this class of antioxidants is a result of the tremendous loss in potency of the antioxidant when certain motor fuels are in contact with an aqueous phase having a pH of less than about 5. When a gasoline composition containing a substantial proportion of cracked gasoline is distributed through a common system of distribution as described above, it frequently encounters conditions such that substantially all of the antioxidant potency is destroyed as a consequence of prolonged contact with an acidic aqueous phase which reduces the antioxidant potency to a very pronounced degree in most cases. A consideration of several members of the N,N'-dialkyl-p-phenylenediamine class of antioxidants shows that they are subject to a considerable loss in antioxidant potency when in contact with an aqueous phase having a pH of less than 5. Moreover, a study of the reduction in the antioxidant potency shows that there is no simple relationship between loss in potency and variation in the chemical structure of this class of antioxidants. This is clearly illustrated by the drawing which is a part of this specification.

With these circumstances in mind it was most unexpected to discover that three members of the class of N,N'-dialkyl-p-phenylenediamines had an unusually efficacious antioxidant potency when employed in cracked gasolines and similar gasoline compositions which might come into contact with an aqueous acidic phase sometime prior to their employment as motor fuels. Moreover, it was quite surprising to discover that these three particular antioxidant compounds were substantially color-free and did not contribute to the formation of colored products when employed in the stabilization of aviation and other motor fuels wherein the preservation of the original dye coloration was important.

It is an object of this invention to provide three organic compounds which are highly effective in gasoline compositions for inhibiting the formation of gum in cracked or polymerized or related gasoline compositions, for retarding deterioration of tetra-alkyl lead in leaded gasolines, for maintaining a high antioxident potency when the gasoline composition is subject to contact with acidic water and for avoiding substantial discoloration of either the gasoline or the aqueous phase.

It is a further object of this invention to provide gasoline compositions comprising a substantial proportion of cracked gasoline or the like which are stabilized with one of the antioxidants of this invention.

A further object of this invention is to provide a process for stabilizing gasoline compositions containing a substantial proportion of cracked gasoline or the like by a method wherein one or more of the three efficacious antioxidents of this invention is incorporated into the gasoline.

Further objects will become apparent hereinafter.

According to a particular embodiment of this invention, there is provided a method of improving a gasoline composition comprising a substantial proportion of cracked gasoline or the like, particularly in regard to the resistance to deterioration of said gasoline composition when in contact with a minor proportion of an aqueous phase having a pH of less than 5, which method comprises introducing into said gasoline composition and dissolving therein a stabilizing amount of an antioxidant selected from the group consisting of N,N'-bis(1-methylhexyl)-p-phenylenediamine, N,N'-bis(1-ethyl-3-methylpentyl)-p-phenylenediamine, and N,N'-bis(1-methylheptyl)-p-phenylenediamine.

Another principal embodiment of this invention encompasses a gasoline composition which is made up of a substantial proportion of a cracked gasoline which is normally subject to oxidative deterioration when in intimate contact for a prolonged period of time with an aqueous phase having a pH of less than about 5, said gasoline containing a stabilizing amount of at least one anti-oxidant selected from the group consisting of N,N'-bis(1-methylhexyl)-p-phenylenediamine, N,N'-bis(1-ethyl-3-methylpentyl)-p-phenylenediamine, and N,N'-(1-methylheptyl)-p-phenylenediamine, which antioxidants are characterized by causing substantially no discoloration of the said aqueous phase and the antioxidant potency retains a high degree of efficaciousness even when the gasoline is permitted to come into intimate contact for a prolonged period with said aqueous phase.

This invention more particularly provides the following advance in the art: In the method for distributing a stabilized gasoline composition containing a substantial proportion of cracked gasoline through normal distribution channels from the manufacturer to the ultimate consumer involving storage of said gasoline in contact with an aqueous phase having a pH of less than about 5 wherein said gasoline is stabilized with an N,N'-dialkyl-p-phenylenediamine as an antioxidant, the improvement which comprises employing N,N'-bis(1-ethyl-3-methylpentyl)-p-phenylenediamine as at least a substantial proportion of said stabilizing antioxidant. Alternatively, the other less effective antioxidants of this invention can be similarly employed although it is apparent that they are not of equivalent value. Moreover, it can be especially advantageous in many instances to employ a mixture of a lower alkyl member of the class of N,N'-dialkyl-p-phenylenediamine antioxidants (wherein the alkyl radical contains from 3 to 5 carbon atoms) together with one of the antioxidants of this invention. In such cases, there is advantageously employed about 25 to 75% by weight of at least one of the antioxidants of this invention and from about 75% to about 25% by weight of an antioxidant such as N,N'-disec. butyl-p-phenylenediamine. Advantageously, the use of N,N'-diisopropyl-p-phenylenediamine is preferred since this combination with the antioxidants of this invention produces no substantial discoloration of the gasoline or any acidic aqueous phase. For example, employing these components in a weight ratio of 1 part of N,N'-diisopropyl-p-phenylenediamine to 3 parts of N,N'-bis(1-ethyl-3-methylpentyl)-p-phenylenediamine produced an antioxidant composition which tests show to be especially efficacious for all gasoline compositions regardless of the presence of acidic water but which is also remarkably potent when the gasoline is in contact with acidic water.

Although the pH of the aqueous phase which is responsible for the reduction in antioxidant potency generally is less than about 5, it is apparent that this invention also pertains to compositions having a somewhat higher pH which is less than 7. Generally, the pH of the aqueous phase does not become as low as 1. For purposes of showing the improvement contributed by this invention, it has been convenient to select a representative pH of 2 for purposes of showing the effectiveness of the compounds covered by this invention in contrast to other compounds of this same general class.

The antioxidants of this invention can be employed alone or in combination with each other or in combination with other antioxidants, stabilizers, additives or other compounds which can usefully be included in gasoline compositions.

It is generally advantageous to employ from about 0.0001 to about 0.05% by weight of at least one of the antioxidants of this invention based upon the weight of the gasoline composition being stabilized. The presence of such a quantity of one or more of these antioxidants causes none or no more than a faint trace of reddish discoloration in the aqueous phase in contact with the gasoline.

In order to show the improvement contributed by this invention, tests were conducted employing the Oxygen Bomb Stability Test which is described in Ind. Eng. Chem. (Ind. Ed.) 24, 1375 (1932). This test measures the induction period of the gasoline as the time in minutes before rapid oxidation begins, the sample of gasoline being heated at 100° C. under 100 pounds per square inch of oxygen.

In order to satisfactorily measure the effect of contact with an aqueous phase having a pH of less than 5, it is necessary to adopt representative standard conditions. Since the acids present in the acidic waters in contact with gasoline under commercial conditions may contain both inorganic and organic acids, tests were run employing both acetic acid and hydrochloric acid.

The drawing shows the effects of shaking Pennsylvania thermal cracked gasoline for five minutes with 20 volume percent of aqueous acidic solutions having a pH of 2. One set of data was determined employing hydrochloric acid as the inorganic acidic agent and another set of data were determined employing acetic acid ($CH_3COOH$) as the organic acidic agent. In each case the antioxidant was employed in the amount of 0.01% by weight based upon the weight of the gasoline. The induction period of the gasoline is shown in terms of the number of minutes.

This drawing demonstrates that there is no obvious correlation between the carbon content of the alkyl radicals and the antioxidant potency when the gasoline is in contact with an aqueous acidic phase. In fact, when the presence of an aqueous acidic phase is not considered as in the usual tests which are run with gasoline free from water, the antioxidant potency declines as the number of carbon atoms in the alkyl groups increases. Thus, it was all the more surprising to discover that when the alkyl groups were certain heptyl and octyl isomers, then the antioxidant potency was greatly enhanced when an aqueous acidic phase is present.

Although numerous patents refer to the employment of an N,N'-dialkyl-p-phenylenediamine as an antioxidant for gasoline, these patents generally disclose that the compounds contemplated are those wherein the alkyl radical is a lower alkyl radical. This is based upon the fact that when higher alkyl radicals are present in the molecule, the antioxidant potency is definitely diminished. The present invention now has provided the surprising discovery that certain particular higher alkyl radicals contribute a surprisingly high degree of antioxidant potency when the gasoline is in contact with an aqueous acidic phase. Also quite surprisingly, the antioxidant potency of the compounds covered by this invention is substantially the same regardless of whether the gasoline is contacted with an aqueous acidic phase.

In addition to their stability in the presence of an aqueous acidic phase, the antioxidants of this invention are not affected by the presence of caustic solutions.

Usually the acidic waters with which inhibited gasoline comes into contact during storage have a pH higher than 3. Tests regarding the antioxidants of this invention show that their efficacious qualities exist over a wide range of pH from below 2 up to 6.5. Generally the pH encountered will fall within the range from about 1.5 to about 5.

Although this invention is primarily directed toward the stabilization of cracked gasoline, this invention also applies to the stabilization of other substrates such as essential oils, straight run gasolines, petroleum oils, animal and vegetable oils, waxes, greases, synthetic lubricants, latices, plastics, resins, etc. In fact, the principles of this invention can be applied in any instance where the inhibitor loss is aggravated by contact with an aqueous acidic phase during the transportation or storage of the substrate which is susceptible to oxidative deterioration.

The periods of time during which gasoline may be in contact with an acidic aqueous phase as contemplated herein may vary considerably. As shown by the examples in the drawing, a period of 5 minutes may be more than sufficient to seriously deplete antioxidant potency when the gasoline is shaken with 20% by volume of an aqueous phase having a pH of 2. Ordinarily, prolonged periods of from several hours up to several months are encountered and are most particularly contemplated. Thus, in normal distribution, it takes a minimum of several days to get the gasoline from the manufacturer to the ultimate consumer. Ordinarily, during such a minimum period, this invention contemplates contact with an aqueous acidic phase for at least 6 hours which would obviously include some period of agitation. The proportion of acidic water to gasoline may be more or less than the 20% employed in the tests described, e.g. (0.01% to 35% by volume). If it is only a fraction of one percent, e.g. 0.1%, then longer contact or more vigorous agitation will be required to result in serious loss in antioxidant potency.

Although this invention is described herein with considerable detail as regards certain embodiments thereof, it will be understood that variations and modifications can be effected without departing from the scope of the invention as described herein and as defined in the appended claims.

The particular compounds which are employed as antioxidants according to this invention can be advantageously prepared by various known procedures. The following description sets forth especially advantageous techniques.

EXAMPLE A

*Preparation of N,N'-bis(1-methylheptyl)-p-phenylenediamine*

108 g. of p-phenylenediamine and 800 g. of methyl-n-hexyl ketone were refluxed in a 2-l. flask for 7 hr. until 37 ml. of water had been collected in the decanter. Heating was discontinued and the excess methyl-n-hexyl ketone was distilled off under reduced pressure. A weight of 330 g. of crude Schiff's base was recovered. The 330 g. of Schiff's base, 30 g. of methyl-n-hexyl ketone, and 3 g. of copper-chromite catalyst were charged to a hydrogenation autoclave and hydrogen pressure of 100 p.s.i. applied. The temperature was raised to 165–175° C. with agitation. These conditions were maintained for 5 hr. until hydrogen uptake had stopped. The autoclave was cooled and vented and the batch removed and filtered to remove catalyst. The batch was stripped of 25.1 g. of low boiling component (methyl-n-hexyl ketone and capryl alcohol) at reduced pressure. A weight of 321.2 g. of crude N,N'-bis(1-methylheptyl)-p-phenylenediamine was recovered (theory=332.0 g.).

EXAMPLES B AND C

*Preparation of N,N'-bis(1-methylhexyl)-p-phenylenediamine and N,N'-bis(1-ethyl-3-methylpentyl)-p-phenylenediamine*

These compounds were prepared by essentially the same procedures as Example A except that different ketones were used. In the case of the first compound the ketone, methyl-n-amylketone was employed. In the latter case the ketone used was 5-methylheptanone-3.

What is claimed is:

1. Gasoline comprising a substantial proportion of cracked gasoline normally subject to oxidative deterioration when in intimate contact for at least six hours with an aqueous phase having a pH of less than about 5, said gasoline containing a stabilizing amount of at least one antioxidant selected from the group consisting of N,N' - bis-(1 - methylhexyl) - p - phenylenediamine, N,N' - bis(1 - ethyl - 3 - methylpentyl) - p - phenylenediamine, and N,N'-bis(1-methylheptyl)-p-phenylenediamine which antioxidants are characterized by causing substantially no discoloration of said aqueous phase and the gasoline phase has an induction period of at least 300 minutes measured by the oxygen bomb stability test wherein the composition contains 20 volume percent of said aqueous phase which has a pH of 2 and the composition is shaken 5 minutes.

2. Cracked gasoline in intimate contact with a minor proportion of an aqueous phase having a pH of less than about 5, said gasoline containing from about 0.0001 to about 0.05 percent by weight of an antioxidant selected from the group consisting of N,N'-bis(1-methylhexyl)-p-phenylenediamine, N,N' - bis(1 - ethyl - 3 - methylpentyl)-p-phenylenediamine, and N,N'-bis(1-methylheptyl)-p-phenylenediamine, which antioxidants cause no more than a trace of pink discoloration in said aqueous phase and the gasoline phase has an induction period of at least five times of the corresponding composition containing no antioxidant as measured by the oxygen bomb stability test.

3. Gasoline in contact with an aqueous phase and containing an antioxidant having from 7 to 8 carbon atoms as defined by claim 2 which contains homologous antioxidants having from 3 to 5 carbon atoms such that the total quantity of stabilizing antioxidants consists of from 25% to 75% by weight of said antioxidants having from 7 to 8 carbon atoms and from 75% to 25% by weight of said homologous antioxidants having from 3 to 5 carbon atoms.

4. Gasoline in contact with an aqueous phase and containing a combination of antioxidants as defined by claim 3 wherein said antioxidants consist of N,N'-bis(1-ethyl-3-methylpentyl)-p-phenylenediamine and N,N'-diisopropyl-p-phenylenediamine.

5. An antioxidant composition consisting essentially of from 25% to 75% by weight of N,N'-bis(1-ethyl-3-methylpentyl)-p-phenylenediamine and from 75% to 25% of an N,N'-dialkyl-p-phenylenediamine wherein the alkyl radicals contain from 3 to 5 carbon atoms.

6. A composition consisting essentially of about 3 parts by weight of N,N'-bis(1-ethyl-3-methylpentyl)-p-phenylenediamine and about 1 part by weight of N,N'-diisopropyl-p-phenylenediamine.

References Cited in the file of this patent

UNITED STATES PATENTS

| 2,120,244 | Dryer | June 14, 1938 |
| 2,385,757 | Cook et al. | Sept. 25, 1945 |
| 2,395,382 | Walters | Feb. 19, 1946 |
| 2,662,815 | Rudel | Dec. 15, 1953 |